A. F. ROWE.
MILK BOTTLE.
APPLICATION FILED AUG. 27, 1914.
1,150,388.
Patented Aug. 17, 1915.
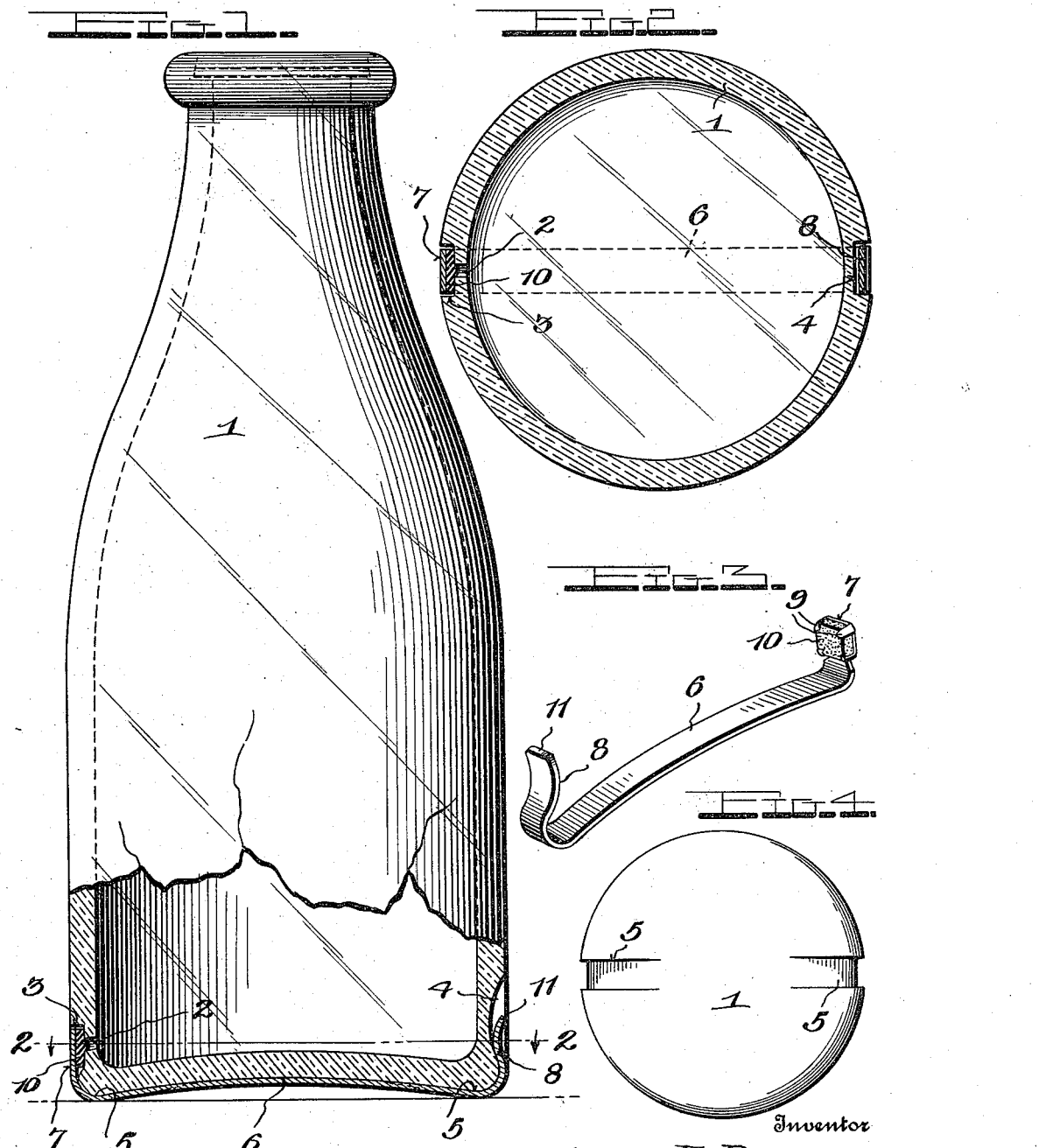
Arthur F. Rowe.

UNITED STATES PATENT OFFICE.

ARTHUR F. ROWE, OF BOISE, IDAHO.

MILK-BOTTLE.

1,150,388.     Specification of Letters Patent.     Patented Aug. 17, 1915.

Application filed August 27, 1914. Serial No. 858,917.

*To all whom it may concern:*

Be it known that I, ARTHUR F. ROWE, citizen of the United States, residing at Boise, in the county of Ada and State of Idaho, have invented certain new and useful Improvements in Milk-Bottles; and I do declare the following to be a full, clear, and exact description of the invention, such as will enable others skilled in the art to which it appertains to make and use the same.

This invention relates to new and useful improvements in receptacles for containing fluids and more particularly to milk receptacles and the primary object is to provide a bottle provided with means for removing the milk therefrom without disturbing the cream therein.

A further object of the invention resides in providing a bottle having an aperture in the wall adjacent the bottom thereof and a still further object resides in providing an improved covering member for the opening in the bottle.

Still another object of the invention resides in providing a spring clasp having a plug at one end thereof for engagement with the bottle over the opening therein to form a closure for the latter.

A still further object resides in providing a device which is simple and durable in construction, inexpensive to manufacture and one which will be very efficient in use.

With these and other objects in view my invention consists in the novel features of construction, combination and arrangement of parts as will be hereinafter referred to and more particularly pointed out in the specification and claims.

In the accompanying drawing forming a part of this application, Figure 1 is a side elevation of a device constructed in accordance with my invention, parts being broken away and parts being disclosed in section to disclose more clearly the application of the invention to use; Fig. 2 is a horizontal section through the device as seen on line 2—2 of Fig. 1; Fig. 3 is a perspective view of the spring clasp member removed; Fig. 4 is a bottom plan view of the bottle.

In describing the invention I shall refer to the drawing in which similar reference characters designate corresponding parts throughout the several views and in which 1 denotes a milk bottle of the usual design formed of glass or other material in the wall of which on a line with the bottom, is an aperture 2 which enables the milk in the receptacle to be withdrawn therefrom without disturbing the cream which it is well understood rises to the top of the milk when the latter settles in the bottle.

One of the important features of the invention is the provision of a bottle having an opening immediately adjacent the bottom for the purpose above described but it will be obvious that in carrying out this idea a means must also be provided for closing the opening and readily removing such closure when desired. To this end the wall of the bottle which surrounds the aperture 2 is provided with a socket or the like 3 and the wall of the body at a diametrically opposite point from the socket 3 is also provided with a groove or recess 4. The socket 2 and the groove 4 are continued downwardly in the wall of the bottle to the bottom thereof and continue for a short distance along the bottom as indicated at 5.

Extending diametrically across the bottom of the receptacle 1 and designed to conform to the curvature of the bottom is a spring metal clasp 6 the ends of which are curved and bent angularly as indicated at 7 and 8 respectively. These bent ends 7 and 8 are adapted to be received in the socket and groove 2 and 4 respectively and said bent ends are designed also coincident to the outline of the socket and groove in which the same fit. This spring clasp is designed to snap snugly in place and the end 7 has prongs 9 formed thereon which clasp thereagainst a plug 10 which is adapted to form a closure for the aperture 2 when the spring clasp is applied to the bottle. The opposite end of the spring clasp is distorted outwardly as shown at 11 to form a finger piece or the like and in order to readily grasp the same to disengage the clasp from the bottle when desired, the groove 4 is cut away deeply and extended a short distance above the end 11 as clearly shown in Fig. 1 of the drawing.

From the above description of the construction of the device it will be seen that the spring clasp when properly applied to the bottle as shown in Fig. 1 of the drawing permits the plug 10 to form a perfect closure for the aperture 2 in the bottle and this spring closure fits sufficiently tight to prevent any possible leakage therethrough. However, when it is desired to remove the contents of the bottle such as milk without removing the cream which usually rises to the surface of the milk, it is only necessary to grasp the end 11 through a finger of the hand and force downwardly thereon which disengages the clasp and removes the closure from the aperture. When a sufficient amount of the milk has been removed the spring clasp may be readily applied to again fit the closure over the aperture.

From the foregoing it will be seen that I have provided a simple, inexpensive and efficient means for carrying out the objects of the invention and while I have particularly described the elements best adapted to perform the functions set forth, it will be obvious that various changes in the form, proportion and in the minor details of construction may be resorted to, within the scope of the appended claims, without departing from the spirit or sacrificing any of the principles of the invention.

Having thus described my invention, what I claim is:

1. A receptacle having an aperture in the wall adjacent the bottom thereof, a spring clasp extending diametrically across the bottom of said receptacle and having its ends engaging the walls thereof, and a plug carried by the spring end of said clasp for forming a closure for the aforesaid aperture.

2. A receptacle having an aperture in the wall adjacent the bottom thereof, said wall also having recesses at diametrically opposite points therein, one recess surrounding the aforesaid aperture, a spring clasp applied to the bottom of the receptacle and having its ends received in the aforesaid recesses in the wall of said receptacle, and means carried by one end of said clasp for forming a closure for said aperture.

3. A receptacle having an aperture in the wall adjacent the bottom thereof, and also provided with longitudinally extending recesses of unequal length in said wall at diametrically opposite points therein, the shortest recess encircling the aforesaid aperture and the longest having an outwardly sloping wall, a spring metal clasp extending diametrically across the bottom of said receptacle and having its ends bent upwardly for reception in the aforesaid grooves, one end thereof being also bent outwardly to form a finger piece and adapted for reception in the longest groove of the receptacle, and a plug carried on the opposite end of said clasp for reception in the other groove to provide a closure for said aperture.

In testimony whereof I have hereunto set my hand in presence of two subscribing witnesses.

ARTHUR F. ROWE.

Witnesses:
 FRANK MARTIN,
 M. B. STERRETT.

Copies of this patent may be obtained for five cents each, by addressing the "Commissioner of Patents, Washington, D. C."